United States Patent [19]
Gloriod

[11] 4,191,821
[45] Mar. 4, 1980

[54] PROCESS FOR PURIFYING RECIRCULATING GASES OF CONDENSED POLYMER PARTICLES

[75] Inventor: Pierre Gloriod, Lillebonne, France

[73] Assignee: Societe Chimique des Charbonnages - CdF Chimie, France

[21] Appl. No.: 923,656

[22] Filed: Jul. 11, 1978

[30] Foreign Application Priority Data

Jul. 13, 1977 [FR] France .................. 77 21758

[51] Int. Cl.² .................................. C08F 220/42
[52] U.S. Cl. ........................... 528/501; 528/502; 55/80; 55/97
[58] Field of Search .......... 55/1, 97, 80, 267, 268, 55/269; 528/502, 501, 480

[56] References Cited

U.S. PATENT DOCUMENTS

| | | | |
|---|---|---|---|
| 1,548,288 | 8/1925 | Smith | 55/97 |
| 3,255,171 | 6/1966 | Elbracht | 528/501 |
| 3,454,542 | 7/1969 | Cheap, Jr. et al | 528/500 |
| 3,627,746 | 12/1971 | Beals et al. | 528/501 |
| 3,892,550 | 7/1975 | Rils | 55/269 |
| 4,093,100 | 6/1978 | Ford et al. | 220/3 |
| 4,105,842 | 8/1978 | Nicco et al. | 528/501 |

FOREIGN PATENT DOCUMENTS

| | | | |
|---|---|---|---|
| 2313399 | 12/1976 | France | 55/84 |
| 465897 | 5/1937 | United Kingdom | 55/269 |
| 982228 | 2/1965 | United Kingdom | 528/501 |
| 301427 | 3/1977 | U.S.S.R. | 55/1 |

OTHER PUBLICATIONS

Perry-Chemical Engrs. Handbook 4th Edition pp. 20-60, 20-74.

*Primary Examiner*—Bernard Nozick
*Attorney, Agent, or Firm*—Finnegan, Henderson, Farabow & Garrett

[57] ABSTRACT

A process for eliminating low molecular-weight polymers from the recirculating gases of facilities carrying out ethylene polymerization or copolymerization at a pressure of 300 to 2500 bars and a temperature of 130° C. to 350° C., in which facilities the mixture of monomer and polymer leaving the reactor is expanded into a separator operating under a pressure of 50 to 500 bars. The gases are passed, at a temperature at least 20° C. higher than the melting point of the low molecular-weight polymers, through at least one standard cyclone at an inlet velocity between 1 and 10 m/s. The gases are then cooled to a temperature lower than the melting point of the low molecular-weight polymers, and are then passed through at least one heated cyclone at an inlet velocity between 2 and 20 m/s.

8 Claims, 3 Drawing Figures

PROCESS FOR PURIFYING RECIRCULATING GASES OF CONDENSED POLYMER PARTICLES

BACKGROUND OF THE INVENTION

The present invention relates to a process for eliminating low molecular-weight polymers from the recirculating gases of facilities carrying out ethylene polymerization at high pressure and high temperature.

Polymerization and copolymerization of ethylene at a pressure of 300 to 2500 bars and at a temperature of 130° C. to 350° C. are known reactions. In such facilities, the mixture of unpolymerized gaseous monomer(s) and liquid polymer leaving the reactor is first expanded into a separator operating at a pressure of 50 to 500 bars. These unpolymerized gaseous monomers shall be referred to hereinafter as recirculating gases. After the separator, these gases are cooled to a temperature on the order of 20° to 60° C., then returned to a compressor. The efficiency of the separator being imperfect, the recirculating gases contain polymer either in the form of condensed particles (solid or liquid) or in the form of products dissolved in said gases.

The polymer present in the recirculating gases in the form of condensed particles may come:

either from a vesicular carrying away of the polymer located in the separator, or from a precipitation of the polymers initially dissolved, since their solubility in the recirculating gases is reduced by the progressive lowering of the temperature and pressure of these gases. The polymers present in the recirculating gases are generally low molecular-weight products called low polymers or fats.

The condensed particles of polymer present in the recirculating gases may be liquid or solid particles according to the temperature of the recirculating gas. In facilities carrying out production of high density polyethylene, the condensed particles are generally liquid when the gas temperature is higher than about 90° C.; in facilities carrying out production of low density polyethylene, the condensed particles are generally liquid when the gas temperature is higher than about 60° C.

It is well known in the high pressure polymerization technique that the progressive accumulation of low polymers in the gas recirculating lines causes clogging, prevents normal operating of the compressor, and intermittently involves considerable maintenance costs for the facility. The present invention therefore relates to a process for removing condensed polymer particles from the recirculating gases.

SUMMARY OF THE INVENTION

The process according to the invention comprises eliminating low molecular-weight polymers from the recirculating gases of facilities carrying out ethylene polymerization or copolymerization at a pressure of 300 to 2500 bars and a temperature of 130° C. to 350° C., in which facilities the monomerpolymer mixture leaving the reactor is expanded into a separator operating under a pressure of 50 to 500 bars, by passing the recirculating gases, at a temperature at least 20° higher than the melting point of the low polymers contained therein, through at least one standard cyclone at an inlet velocity between 1 and 10 m/s, then cooling the gases to a temperature lower than the melting point of the low polymers still contained therein, and then passing the gases through at least one heated cyclone at an inlet velocity between 2 and 20 m/s.

The standard cyclone is preferably located inside a pressure-resistant vessel. It is preferred that the heated cyclone be capable of resisting a pressure of 50 to 500 bars.

In a preferred embodiment, the gases are passed through a vesicle removing means, after passage through a standard cyclone and before cooling, to coalesce liquid polymer particles smaller than or equal to 5 microns. They may then be passed through a standard cyclone prior to being cooled.

In a further preferred embodiment, low molecular-weight polymers separated from the gases are collected in at least one decanter and injected into a polymer line of the facility at a pressure lower than that of the separator.

The accompanying drawings, which are incorporated in and constitute a part of this Specification, illustrate several embodiments of the invention and, together with the description, serve to explain the principles of the invention.

DESCRIPTION OF THE PREFERRED EMBODIMENTS

Figure 1:
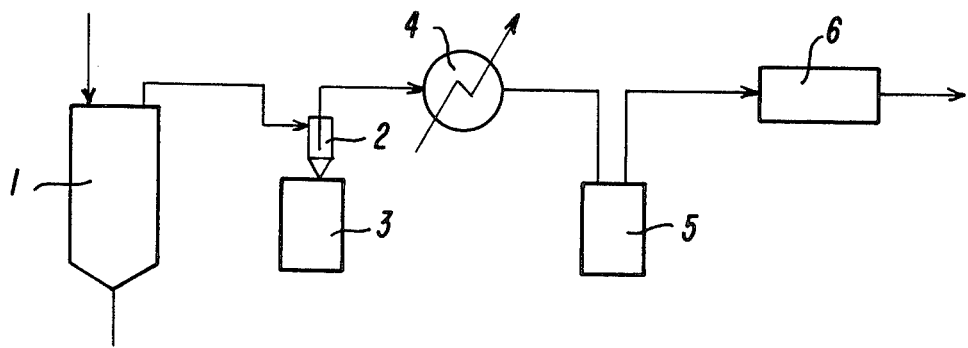
FIG. 1 is a flow diagram of a facility for carrying out a process falling ouside the scope of the present invention.

Reference will now be made in detail to the present preferred embodiments of the invention, examples of which are illustrated in the accompanying drawings.

The use of cyclones for effecting the separation of condensed particles contained in a gas is well known, and their efficiency is excellent for condensed particles having a diameter higher than or equal to $10\mu$; the present invention is therefore directed to the number and position of the cyclones on the path of the recirculating gases, as well as to their operating conditions which are particular to the nature of both gas and particles.

The cyclones used according to the invention for separating molten low polymers are generally located inside a pressure-resistant vessel. Under these conditions, the wall of the cyclone will not be subjected to great pressure differences. Such a cyclone may therefore easily be designed so that it is as close as possible to the standard cyclones defined in Perry's Chemical Engineers' Handbook (4th Edition, 1963), pages 20–68 to 20–74. In particular, a rectangular gas inlet tube, which corresponds to an optimal yield for such cyclones, may be used.

The cyclones used in the invention for separating solid low polymers are generally exposed to the open air, since their walls must be capable of being reheated. Such a cyclone will consequently have walls that can resist very high pressures (from 50 to 500 bars for example). Under these conditions, it is not always possible to make a cyclone complying with the known standards, and a forged cyclone may have to be used on which the heating envelope may be mounted according to the technique disclosed in West German Patent No. 2,648,613. In such a case, the gas inlet pipe will have to be circular, for construction reasons. The heating system of such cyclones will be able to ensure a temperature of 70° C. to 150° C. at the inner surface, and the melting of any low polymer deposit.

To improve the efficiency of the separation, it is generally desirable, according to the present invention, to use a plurality of successive cyclones of one and/or the other of the two categories mentioned above, these cyclones being possibly separated by coolers. However, this solution presents the drawback of considerably increasing both the total volume of the separation device and the investment costs. This is why, according to a novel aspect of the invention, it is proposed to associate with the cyclones other separating means of lower cost and bulk.

According to an improved embodiment, the process according to the invention comprises, after passage of the recirculating gases in a standard cyclone and before their cooling, passing the recirculating gases through a vesicle removing means capable of coalescing the liquid particles having a dimension smaller than or equal to 5μ.

As embodied herein, vesicle removing means should be understood to mean a wall or assembly of porous walls with very tiny holes whose diameter is close to the mean amplitude of diffusion during the crossing through the orifice. Such a device ensures an excellent coalescence by making larger particles that may easily be trapped thereafter by means of a cyclone. Thus, after passage of the gases through the vesicle removing means and before cooling, they may be passed through a standard cyclone at an inlet velocity of 1 to 10 m/s.

The vesicle removing means used in the invention are preferably constituted by stainless steel having a porosity of between 0.2 and 1.0 and being either in the form of a sintered material or in the form of a textile material such as voile or felt. Moreover, as has been suggested hereinabove, it may be particularly advantageous to pass the recirculating gases, before they are cooled, through an association constituted in series by a cyclone, a vesicle removing means, and a cyclone.

Finally, another feature of the invention lies in the contribution of the process to the efforts in fighting pollution and in energy conservation, which is achieved by recycling the low polymers eliminated from the recirculating gases. In fact, up to the present time, it was usual to collect these low polymers in containers and consider them as unusable waste which had to be eliminated either by dispersion in the environment or by combustion, although these products are poor combustibles.

Figure 3:
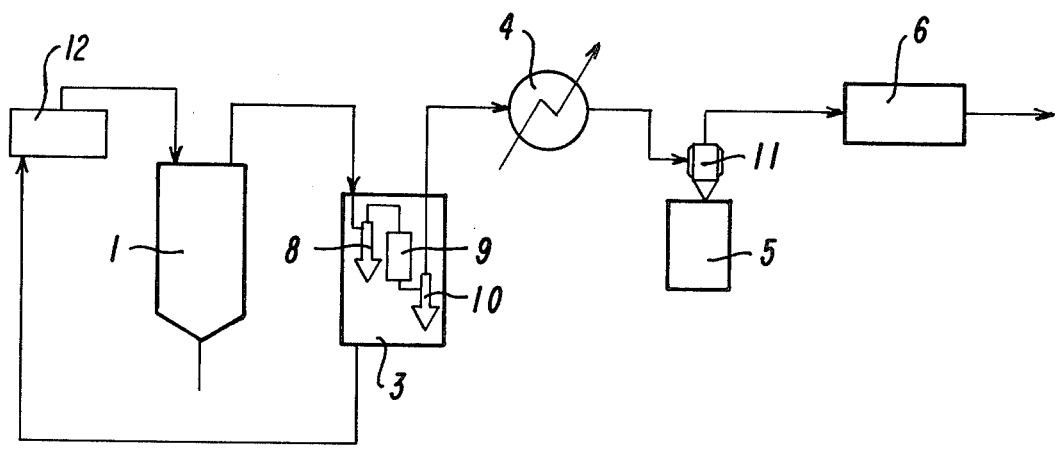

An embodiment of the invention therefore comprises collecting the low polymers separated from the gases in at least one cyclone or vesicle removing means in at least one decanter and then injecting them into a polymer line of the facility at a pressure lower than that of the separator. This is illustrated in FIG. 3 wherein low polymers collected in decanter 3 are injected into a polymer line of the polymerization or copolymerization facility 12 upstream of the separator. Polymer line should be understood to mean a line in which circulates either a mixture of polymer and of unpolymerized monomer or a virtually pure molten polymer. For example, when the polymerization process comprises injecting monomer upstream of the separator at a pressure lower than that of the separator as in French Patent No. 2,313,399, it may be advantageous to inject the low polymers separated from the recirculating gases at the same time as the monomer and by means of the same injector. According to another example, it is also possible and advantageous to expand these low polymers after having collected them at the outlet of the cyclone, then to inject them into the molten polymer issuing from the hopper at low pressure (1 to 20 bars) which is present in any facility for the high pressure polymerization of ethylene, downstream of the separator. In both cases it is ascertained that the recycling of the low polymers does not harm correct operating of the facility, or the quality of the polyethylene produced.

The present invention is also applicable to the copolymerization of ethylene with α-olefins such as propylene, 1-butene, and 1-hexene. When a free-radical yielding catalyst is used, the invention is applicable to the copolymerization of the ethylene with polar comonomers such as carbon monoxide, maleic anhydride, and vinyl esters. When a catalyst comprising a transistion metal compound is used, the invention is applicable to the terpolymerization of the ethylene with an α-olefin such as propene and a non-conjugated diolefin.

As previously known, one or more chain transfer agents may also be present in the reaction mixture such as, for example, hydrogen, in order to regulate and check the characteristics of the polymer. The reaction mixture may then comprise an inert diluent; when the catalyst comprises a transition metal compound, it may be a hydrocarbon such as propane or butane at the rate of 1 to 20% by weight with respect to the gaseous mixture.

In this way, in the preceding statement of the invention and its particular aspects, gas should be understood to mean the stream of ethylene possibly containing one or more comonomers and/or one or more transfer agents and/or one or more inert diluents. Free-radical yielding catalyst should be understood to mean oxygen, peroxides, and peresters. Catalyst comprising a transition metal compound should be understood to mean a catalytic system comprising (a) an activator such as a trialkylaluminium, a halodialkylaluminium, or an alkylsiloxalane and (b) an optionally supported halogen compound of a transition metal of groups IV A to VI A. Among these compounds, mention may be made, as the most usual ones, of the π-allyl or benzyl complexes of chromium, zirconium, and titanium, as well as titanium trichloride syncrystallized with aluminum chloride, and optionally supported on magnesium chloride. The catalysts are preferably used dissolved or dispersed in an inert diluent.

The process of the invention is carried out continuously, either in a stirred autoclave reactor or in a tubular reactor; this latter type of reactor is in fact constituted by successive zones delimited by the feed points of monomer and catalyst described for example in East German Patent No. 58,387.

The following non-limiting examples illustrate the invention.

EXAMPLE 1 (comparative)

A facility (shown diagrammatically in FIG. 1) for making ethylene-vinyl acetate copolymer by copylymerization in a reactor under high pressure, at high temperature and in the presence of a radical initiator is considered. At the outlet of the reactor, the mixture is sent into a separator 1 whose pressure is 250 bars. The gases leaving this separator undergo a first cooling at a temperature of about 190° C.; they are then sent at an inlet velocity of 2.25 m/s into a standard cyclone 2, mounted on a decanter 3; the gases are then cooled to a temperature of 20° C. by means of a conndenser 4, then sent into a second decanter 5, then into the suction filter 6 of the compressor. During regular continuous operating of the facility, for 1 ton of copolymer produced, the quantities of fats indicated in Table 1 hereinafter are recovered at 3, 5, and 6. Moreover, it is ascertained that the filter 6 is easily clogged and must therefore be cleaned frequently.

EXAMPLE 2

Figure 2:
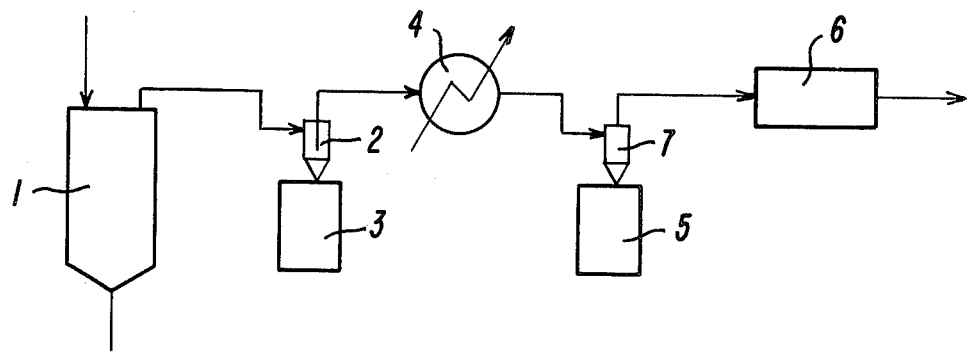
FIGS. 2 and 3 are flow diagrams of facilities that can be used to carry out two different embodiments of the present invention.

A facility for the copolymerization of ethylene and vinyl acetate is considered whose reactor and separator operate under the conditions of Example 1. In this facility (shown diagrammatically in FIG. 2) the recirculating gases, after passing through the cyclone 2 mounted on the decanter 3 and cooling to 20° C., are sent at an inlet velocity of 2.25 m/s into a cyclone 7 mounted on the decanter 5, and then, as before, into the filter 6. Under regular continuous operating of the facility, for one ton of copolymer produced, the quantities of fats indicated in Table 1 hereinafter are recovered at 3, 5, and 6. The clogging of the filter 6 is clearly less frequent than in Example 1.

EXAMPLE 3

A facility for the copolymerization of ethylene and vinyl acetate is considered, identical to that of Example 2, except that cyclone 2 is mounted not on but in the decanter 3. All operating conditions are otherwise the same. Under regular continuous operating of the facility, for 1 ton of copolymer produced, the quantities of fats indicated in Table 1 hereinafter are recovered at 3, 5, and 6.

EXAMPLE 4

A facility for the copolymerization of ethylene and vinyl acetate is considered, identical to that of Example 3, except that cyclone 7 is heated by means of a temperature monitoring enclosure. Under regular continuous operating of the facility, for 1 ton of copolymer produced, the quantities of fats indicated in Table I hereinafter are recovered at 3, 5, and 6. The clogging of the filter 6 then disappears completely.

EXAMPLE 5 (comparative)

A facility will now be considered for manufacturing high density polyethylene by polymerizing ethylene in a reactor under high pressure and at high temperature by means of a catalyst of the Ziegler type (for example according to the technique disclosed in French Patent No. 2,202,897). The facility is shown schematically in FIG. 1 except that it does not comprise a cyclone 2, i.e. the recirculation gases coming from the separator 1 (pressure: 250 bars) pass directly through the decanter 3 before being cooled from 190° C. to 20° C.

During regular continuous operating of this facility, for 1 ton of polyethylene produced, quantities of fats are recovered at 5 and 6 which are expressed in Table II hereinafter relatively to the quantity of fats recovered at 3; this quantity, to which the value 1 is therefore arbitrarily given, will also act as unit for Examples 6 to 8. Frequent clogging of the filter 6 is observed, which must therefore be cleaned.

EXAMPLE 6

A facility for manufacturing high density polyethylene (shown schematically in FIG. 3) is considered, whose reactor and separator operate under the conditions of Example 5. The recirculating gases, at the temperature of 190° C., first pass in a first standard cyclone 8 at an inlet velocity of 5 m/s, then through a vesicle removing means 9, then through a second standard cyclone 10 identical to the first one. The vesicle removing means 9 comprises two concentric tubes made of sintered stainless steel of porosity 0.33; the inner tube ensures the coalescence of the microparticles, and the outer tube ensures the draining of the latter. The series assembly of the cyclone 8, the vesicle removing means 9, and the cyclone 10 is mounted inside the decanter 3. As in the preceding examples, the recirculating gases already partially purified from the low molecular-weight polymers are cooled down to 20° C. by passing through the condenser 4. The gases are then sent into the heated cyclone 11, mounted on the decanter 5, at an inlet velocity of 12 m/s and then towards the filter 6. During regular continuous operating of the facility, the relative quantities of low polymers which are indicated in Table II hereinafter are recovered at 3, 5, and 6. This gas purification system may operate for several months without a need for cleaning any of its elements; it therefore allows substantial saving of maintenance costs.

EXAMPLE 7

A facility for manufacturing high density polyethylene is considered that is identical to that illustrated in FIG. 3, except for the absence of the second standard cyclone 10, i.e. the gases pass directly from the vesicle removing means 9 towards the condenser 4. All operating conditions are otherwise equal to those of Example 6. During continuous regular operating of the facility, the relative quantities of low polymers which are indicated in Table II hereinafter are recovered at 3, 5, and 6.

EXAMPLE 8

A facility for manufacturing high density polyethylene is considered that is identical to that shown schematically in FIG. 3, except for the absence of the second standard cyclone 10 and of the vesicle removing means 9; i.e. the gases pass directly from the standard cyclone 8 to the condenser 4. All operating conditions are otherwise equal to those of Example 6. During regular continuous operation of the facility, the relative quantities of low polymers which are indicated in Table II hereinafter are recovered at 3, 5, and 6.

TABLE I

| Example | 1 | 2 | 3 | 4 |
| --- | --- | --- | --- | --- |
| Decanter 3 | 1.30 kg | 1.60 kg | 1.30 kg | 1.20 kg |
| Decanter 5 | 0.05 kg | 0.20 kg | 0.30 kg | 1.20 kg |
| Filter 6 | 0.50 kg | 0.30 kg | 0.30 kg | 0.01 kg |

TABLE II

| Example | 5 | 6 | 7 | 8 |
| --- | --- | --- | --- | --- |
| Decanter 3 | 1.00 kg | 3.20 kg | 3.00 kg | 2.50 kg |
| Decanter 5 | 0.50 kg | 0.70 kg | 0.30 kg | 1.00 kg |
| Filter 6 | 0.50 kg | 0.02 kg | 0.20 kg | 0.05 kg |

It will be apparent to those skilled in the art that various modifications and variations could be made in the process of the invention without departing from the scope or spirit of the invention.

What is claimed is:

1. A process for eliminating low molecular-weight polymers from recirculting gases of facilities carrying out polymerization or copolymerization of ethylene at a pressure of 300 to 2500 bars and a temperature of 130° C. to 350° C., in which facilities a mixture of monomer and polymer leaving the reactor is expanded into a separator operating under a pressure of 50 to 500 bars, said gases being the gaseous phase leaving said separator, comprising (a) passing said gases, at a temperature at least 20° C. higher than the melting point of the low polymers, through at least one standard cyclone at an inlet velocity between 1 and 10 m/s to eliminate some of said low polymers;

(b) then cooling said gases from said cyclone to a temperature lower than the melting point of the low polymers; and (c) then passing said cooled gases through at least one heated cyclone at an inlet velocity between 2 and 20 m/s to eliminate more of said low polymers.

2. The process of claim 1, wherein the standard cyclone is located inside a pressure-resistant vessel.

3. The process of claim 1, wherein the heated cyclone is designed to resist a pressure of 50 to 500 bars.

4. The process of claim 1, further comprising, after passage of the recirculating gases through a standard cyclone and before cooling, passing said gases through a coalescing means capable of coalescing liquid polymer particles having a dimension smaller than or equal to $5\mu$.

5. The process of claim 4, further comprising, after the passage of the recirculating gases through a coalescing means and before cooling, passing said recirculating gases through a standard cyclone at an inlet velocity of 1 to 10 m/s.

6. The process of claim 4, wherein the coalescing means is constituted of stainless steel having a porosity between 0.2 and 1.0.

7. The process of claim 5, further comprising collecting low polymers separated from said gases in said coalescing means or said cyclones in at least one decanter, and injecting said collected polymers into a polymer line of said facilities at a pressure lower than that of said separator.

8. A process for eliminating low molecular-weight polymers from recirculating gases of facilites carrying out polymerization or copolymerization of ethylene at a pressure of 300 to 2500 bars and a temperature of 130° C. to 350° C., in which facilities a mixture of monomer and polymer leaving the reactor is expanded into a separator operating under a pressure of 50 to 500 bars, said gases being the gaseous phase leaving said separator, comprising (a) passing said gases, at a temperature at least 20° C. higher than the melting point of the low polymers, through at least one standard cyclone at an inlet velocity between 1 and 10 m/s to eliminate some of said low polymers;

(b) then cooling said gases from said cyclone to a temperature lower than the melting point of the low polymers;

(c) then passing said cooled gases through at least one heated cyclone at an inlet velocity between 2 and 20 m/s to eliminate more of said low polymers;

(d) collecting low polymers separated from said gases in at least one decanter; and (e) injecting said collected polymers into a polymer line of said facilities at a pressure lower than that of said separator.

* * * * *